United States Patent [19]

Fäsi et al.

[11] Patent Number: 4,869,785
[45] Date of Patent: Sep. 26, 1989

[54] STEAM DISTILLATION APPARATUS

[75] Inventors: Roland Fäsi, Bruetten; Giancarlo Werner, Zurich; Ursula Wolfensberger, Fehraltorf, all of Switzerland

[73] Assignee: Nestec S. A., Vevey, Switzerland

[21] Appl. No.: 200,597

[22] Filed: May 31, 1988

Related U.S. Application Data

[62] Division of Ser. No. 928,517, Nov. 7, 1986, Pat. No. 4,759,944.

[30] Foreign Application Priority Data

Nov. 25, 1985 [CH] Switzerland .......................... 5013/85

[51] Int. Cl.$^4$ .......................... B01D 3/38; B01D 3/42
[52] U.S. Cl. ..................................... 202/159; 202/160; 202/176; 202/205; 202/206; 202/234; 159/43.1; 203/1; 203/2; 203/92; 203/DIG. 18
[58] Field of Search ............... 202/234, 159, 158, 177, 202/176, 205, 160, 236, 206; 203/1, 2, 3, 92, 93, 95–97, DIG. 18; 159/43.1, 16.3, 44, 13.1, 13.2, 27.1; 196/132, 120, 127, 135

[56] References Cited

U.S. PATENT DOCUMENTS

| | | | |
|---|---|---|---|
| 2,251,771 | 8/1941 | Wynn et al. | 203/3 |
| 2,364,341 | 12/1944 | Bright et al. | 203/2 |
| 2,873,799 | 2/1959 | Earley et al. | 159/13.2 |
| 3,004,901 | 10/1961 | Nerge et al. | 159/13.1 |
| 3,322,650 | 5/1967 | Hillburn | 203/3 |
| 3,458,404 | 7/1969 | Vincent et al. | 159/13.2 |
| 3,503,854 | 3/1970 | Good | 202/234 |
| 3,542,653 | 11/1970 | Lowrey et al. | 202/234 |
| 3,660,247 | 5/1972 | Franks et al. | 203/1 |
| 3,849,232 | 11/1974 | Kessler et al. | 159/43.1 |
| 4,342,624 | 8/1982 | Chute et al. | 203/3 |
| 4,394,221 | 7/1983 | Stage et al. | 203/92 |
| 4,617,092 | 10/1986 | Hiramatsu | 203/1 |
| 4,731,175 | 3/1988 | Funk et al. | 203/1 |

FOREIGN PATENT DOCUMENTS

| | | |
|---|---|---|
| 3683768 | 10/1969 | Australia . |
| 1057435 | 5/1959 | Fed. Rep. of Germany . |
| 175040 | 12/1965 | U.S.S.R. ............... 203/1 |
| 725684 | 4/1980 | U.S.S.R. ............... 203/1 |

OTHER PUBLICATIONS

H. Stage, "Seifen-Öle Fette-Wasche", vol. 105, No. 18, 1979, pp. 531–533 (Nov. 8, 1979).
Translation of article from Seifen, Fette Ole Wasche, vol. 105, No. 18, Nov. 1979.
Translation of German Disclosure 1057435, Nov. 1956.

*Primary Examiner*—Wilbur Bascomb
*Attorney, Agent, or Firm*—Vogt & O'Donnell

[57] ABSTRACT

A steam distillation apparatus is provided which has a column body, a head connected to one end of the column body which has a diameter larger than the column body, a sump connected to the other end of the column body and contact elements disposed within the column body which are positioned and arranged to avoid formation of preferential pathways for the steam passing through the column body while providing for ready flow of the material being steam distilled through the column body. The connection of the head and column body may be frustoconical in shape such that its diameter diminishes from a diameter corresponding with that of the head at its connection with the head to a diameter corresponding with that of the column body at its connection with the column body. A collar is positioned at the connection of the neck and column body and extends into the head to define an annular space between the neck and collar. The collar has at least one opening abutting the annular space for providing material to be steam distilled to a distributor positioned in the column body. Additionally, a cell may be provided for measuring the density of the steam distilled material and be connected to an arrangement for regulating temperature of material to be steam distilled by an electronic temperature control circuit for enabling regulating the density of the steam distilled material by regulating the temperature of the material to be steam distilled.

7 Claims, 1 Drawing Sheet

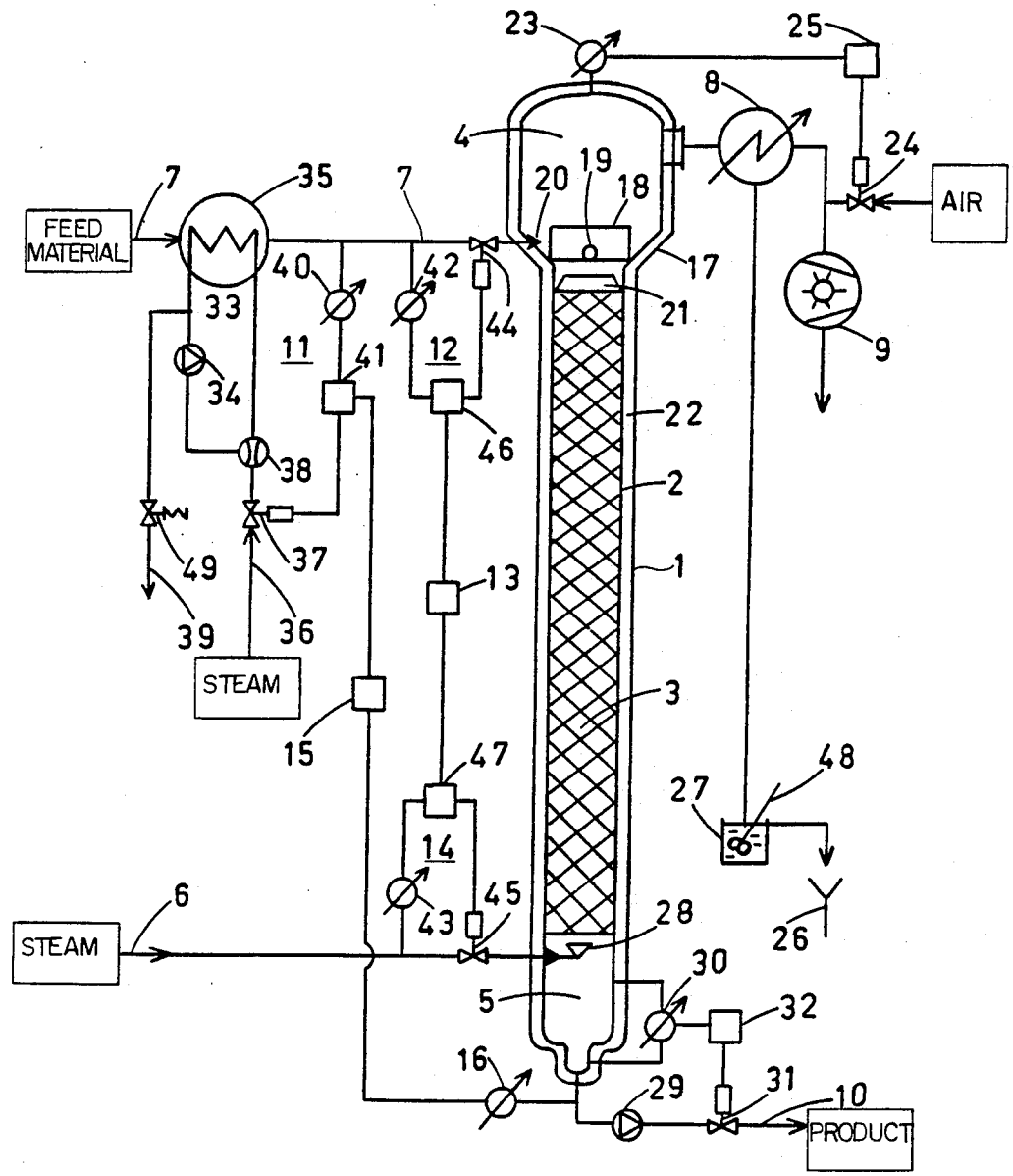

STEAM DISTILLATION APPARATUS

CROSS REFERENCE TO RELATED APPLICATION

This is a divisional application of application Ser. No. 06/928,517 filed Nov. 7, 1986 now U.S. Pat. No. 4,759,944.

BACKGROUND OF THE INVENTION

This invention relates to a steam distillation apparatus particularly for use in eliminating chlorohydrins from vegetable protein hydrolyzates.

This invention relates to a steam distillation apparatus.

Recent studies have shown that non-discoloured liquid seasonings prepared by hydrolysis of vegetable proteins with concentrated hydrochloric acid contain a considerable quantity of chlorohydrins, including in most cases a dominant proportion of 1,3-dichloro-propan-2-ol. The problem of their elimination arises. Various processes may be considered for eliminating these components.

It has been found in particular that pastes obtained by concentrating these seasonings by evaporation or versions of these seasonings obtained by decolouring with active carbon have distinctly lower concentrations of chlorohydrins. However, concentration by evaporation involves a considerable consumption of energy. Similarly, decolouration with active carbon in filter presses, for example, not only involves high outlay on the necessary operations and plant, it also considerably modifies the organoleptic qualities of the seasoning which loses its characteristic taste while retaining its flavour enhancing power.

Another possibility is to hydrolyze a starting material which does not contain any fats, glycerol being precisely the precursor which enables chlorohydrins to be formed with hydrochloric acid. Now, on the one hand, starting materials such as these are more or less commercially unobtainable and, on the other hand, would significantly modify the organoleptic qualities of the seasoning.

Hydrolysis could also be carried out with a chlorine-free mineral acid, such as sulfuric acid or phosphoric acid. However, such a modification of the traditional process would also have adverse affects upon the organoleptic qualities of the seasoning obtained.

Yet another possibility is to separate a fraction of the hydrolyzate containing the chlorohydrins by rectification. However, a process such as this involves at least two separation steps if it is desired to retain in particular in the end product components which perform an important organoleptic function but which are more volatile than the chlorohydrins.

SUMMARY OF THE INVENTION

Included with the disclosure of the present invention is a process for the production of a seasoning which enables the chlorohydrins and, in particular, the 1,3-dichloro-propan-2-ol to be eliminated therefrom simply and effectively without modifying the density of the aminoacid composition or the organoleptic qualities of the seasoning.

To this end, the process is characterized in that, after separation of said first or said second insolubles, the hydrolyzate is subjected to steam distillation under reduced pressure while keeping the density of the hydrolyzate at a substantially constant value in order to eliminate the chlorohydrins, particularly 1,3-dichloro-propan-2-ol therefrom. That is, the chlorohydrins are eliminated by steam distillation under reduced pressure from neutralized liquid hydrolyzates from which at least first insolubles have been separated.

The present invention relates to a steam distillation apparatus comprising a distillation column consisting of a head, a cylindrical body filled with contact elements and a sump; a gas pumping unit connected to said head; a pipe for the introduction of hydrolyzate connected to said column between said body and said head; a steam injection pipe connected to said column between said sump and said body; and a pipe for the removal of hydrolyzate connected to said sump, characterized in that it additionally comprises an arrangement for regulating the temperature of the hydrolyzate connected to said introduction pipe and in that the diameter of said head is considerably larger than the diameter of said body.

It has surprisingly been found that it is thus possible to eliminate virtually all the 1,3-dichloro-propan-2-ol from the hydrolyzate in a single step following the separation of said first or said second insolubles, that this elimination may thus by carried out while keeping the density of the hydrolyzate at a substantially constant value and that the aminoacid composition and the organoleptic qualities of the liquid seasoning thus obtained remain substantially unchanged in relation to those of the seasoning obtained by the traditional process.

Throughout the remainder of the present specification, the abbreviation DCP is used to denote 1,3-dichloro-propan-2-ol. As mentioned above, a seasoning produced by hydrolysis of vegetable proteins with concentrated hydrochloric acid may contain other chlorohydrins than DCP, more especially 3-chloro-propan-1,2-diol and 2,3-dichloro-propan-1-ol. On the other hand, however, the concentration of these chlorohydrins in the seasoning is generally lower than that of DCP while, on the other hand, it has been found that these other chlorohydrins are also substantially eliminated at the same time as the DCP during the process. Thus, it is sufficient to determine the DCP content of the seasoning in order validly to determine whether or not the chlorohydrin content of this seasoning exceeds a certain limit.

Similarly, in the present specification, the term "eliminate" is used in such expressions as "eliminating the DCP from the condiment" to signify that the major part of this substance is removed to leave only an insignificant fraction. It should be noted in this regard that the analytical method used to determine the DCP content of the seasoning, i.e., the concentration of DCP in the seasoning, plays a decisive part in regard to the reproducibility of the result. Thus, a particularly reliable method which even enables concentrations below one tenth of a ppm to be safely determined has been developed within the scope of the present invention. This method is described in detail hereinafter just before the Examples.

DETAILED DESCRIPTION OF THE PROCESS

To carry out the process, vegetable protein sources of various origins may be used as starting material. For example, it is possible to use oil seed cakes, cereal gluten or defatted soya flour.

Accordingly, concentrated hydrochloric acid may be used for hydrolysis. For example, it is possible to use a 4N to 8N and preferably 6N hydrochloric acid, i.e., a hydrochloric acid having a concentration of approximately 15-25% and preferably 20% by weight. Hydrolysis may by carried out in enamelled tanks by stirring the starting material slowly in the acid at a temperature of from 70° to 120° C. over a period of several hours, for example, 6-13 h. A dark-coloured hydrolyzate containing a high proportion of so-called humic insoluble substances, referred to in the present specification as the first insolubles, is generally obtained in this stage of the process. The hydrolyzate may be neutralized with a concentrated base, preferably sodium carbonate in dry or paste-like form, to a pH-value of approximately 5.0-6.0. The neutralized hydrolyzate may then be filtered to eliminate said first insolubles therefrom. The hydrolyzate may be subjected to said steam distillation in this second stage or after having been allowed to stand. The hydrolyzate may be left standing for a more or less long time, for example, for a few days to a few weeks, depending on the application for which it is intended, in order to allow separation of slowly crystallizing substances and slowly agglomerating colloidal particles referred to in the present specification as the second insolubles. Said second insolubles may be separated by filtration. Finally, the hydrolyzate may be subjected to said steam distillation in this third stage unless it was carried out after the separation of said first insolubles. A dark-coloured liquid hydrolyzate is obtained of which the quality is considered as being better the higher its density. Accordingly, the above stages of the process are preferably carried out in such a way as to obtain a density of the hydrolyzate of from 1.250 to 1.265 g/cm$^3$.

After separation of said first or said second insolubles, the hydrolyzate is subjected to steam distillation under reduced pressure while keeping the density of the hydrolyzate at a substantially constant value in order to eliminate the DCP therefrom. It has been found to be important to carry out any steam distillation step under moderate temperature conditions which keep the organoleptic qualities of the hydrolyzate intact and under working conditions which allow virtually no dilution of the hydrolyzate and thus provide for maximum effectiveness of the process for removal of the DCP.

This steam distillation process is preferably carried out at a temperature of from 45° to 70° C. under a pressure of 100-320 mbar by contacting an ascending stream of 10-20 parts by weight/h steam with a descending stream of 100 parts by weight/h hydrolyzate over a contact zone 5-15 m in height filled with contact elements. It has been found that it is preferable not to allow the distillation temperature to exceed 70° C. if it is intended not to cause in particular any modification of the organoleptic qualities of the hydrolyzate. It is preferred to work at temperatures towards the upper end of the above-mentioned range in order not unnecessarily to increase the consumption of energy necessary for reducing the pressure in the column on the one hand and for condensing the steam charged with DCP on the other hand.

The above-mentioned pressure of 100-320 mbar substantially corresponds to the pressure of steam at 45° to 70° C. Accordingly, it is preferred to work under such conditions that the hydrolyzate and the distillation steam are substantially in thermal equilibrium over the entire height of said contact zone, the hydrolyzate showing virtually no increase in its boiling point in relation to water.

The respective quantities of hydrolyzate and steam brought into contact depend in particular upon the residual DCP content of the hydrolyzate which it is desired to obtain, on the height of the contact zone and on the available contact surface in said zone. The ratio between the quantities of hydrolyzate and steam and the height of the contact zone as indicated above enable the concentration of DCP in the seasoning to be reduced by a factor of approximately 10-100. In other words, they enable a concentration of DCP in the hydrolyzate of 1-10 ppm, for example, to be reduced to less than 0.2-0.5 ppm. For a desired reduction factor, it is thus possible to use only the minimum necessary quantity of steam and hence to expend only a minimum of energy. The absolute values of the quantities of steam and hydrolyzate contacted per h, in other words the throughputs, may be selected so as to ensure a DCP transfer level approaching the optimum level over a relatively broad range limited at its upper end by the risks of entrainment of considerable quantities of hydrolyzate by an excessively violent stream of steam.

In regard to the contact surface available in said zone, it is preferably as large as possible and designed adequately to avoid the formation of preferential pathways for the steam while ensuring ready flow of the hydrolyzate. To this end, therefore, the contact zone is filled with contact elements. Although contact elements designed to be loosely arranged, such as spirals or tube sections are also suitable, it is preferred to use contact elements arranged in a predetermined order, such as, for example, corrugated metal sheets drilled with holes and applied to one another across the corrugations. With contact elements such as these, it is possible to obtain a contact surface per unit volume of the contact zone as large as 250 m$^2$/m$^3$, for example. They also enable the inevitable pressure difference between the top and bottom of the contact zones, i.e., between the head and sump of the column, to be limited to a few tens of mbar. This difference should preferably not exceed approximately 100 mbar so that, if the temperature of the hydrolyzate and the steam is, for example, 60° C. at the top of the contact zone, it does not exceed 70° C. at the bottom of the contact zone.

In one preferred embodiment of the process the temperature of the hydrolyzate before steam distillation is kept at a value higher by 1°-5° C. than that of the hydrolyzate above the contact zone. It has been found that it is thus possible to compensate a slight dilution of the hydrolyzate caused by the condensation of a small quantity of steam along the contact zone. This condensation is difficult to eliminate completely, a certain amount of heat being lost despite everything through insulation to be provided between the contact zone and the outside.

In one particular embodiment of the process, the density of the hydrolyzate is kept at a substantially constant value by regulating the temperature of the hydrolyzate before distillation according to the density of the hydrolyzate after distillation. This embodiment is particularly intended for the case where the hydrolyzate is subjected to said steam distillation after the separation of said second insolubles. This is because, in this case, the density of the hydrolyzate may vary in particular according to the time for which it was left standing. If hydrolyzate is taken from different tanks to arrive at a suitable mixture before bottling, for example, this embodiment enables the density to be automatically adjusted to a precise desired value. In cases where, in any event, it is intended to regulate the temperature of the hydrolyzate before distillation, this temperature regulation may be effected around a desired value imposed automatically according to the density of the hydrolyzate after distillation. If the measured density is slightly too low, the desired temperature will be slightly increased so that the hydrolyzate undergoes a slight concentration by evaporation under said reduced pressure. Conversely, if the measured density is too high, the desired temperature will be slightly lowered so that the hydrolyzate undergoes a slight dilution by condensation of the distillation steam under said reduced pressure. This principle of regulation has proved to be particularly simple, safe and effective in practice where the density of the liquid condiment in its retail form has to satisfy very stringent requirements.

DETAILED DESCRIPTION OF THE APPARATUS OF THE INVENTION

The steam distillation apparatus according to the invention is characterized as described below. With regard to the distillation column, it is made up of a head, a cylindrical body filled with contact elements and a sump. It is preferably completely surrounded by an insulating jacket intended to minimize the losses of heat from inside to outside. The cylindrical body delimits said contact zone. It may be filled with contact elements intended to be loosely arranged, such as spirals or tube sections, for example. It is preferably filled with contact elements arranged in a predetermined order.

The head of the column has a diameter considerably larger than the diameter of the body. This is because it has been found that this larger diameter of the head of the column enables the problem of foaming of the hydrolyzate introduced into the column to be largely resolved. If the head of the column were to have the same diameter as the column itself, the foam produced by the gases expanding and leaving the hydrolyzate when it is introduced into the column where said reduced pressure prevails would be in danger of ascending too high in said head while the steam issuing from the column would be in danger of taking with it a considerable quantity of hydrolyzate.

Accordingly, in a preferred embodiment of said apparatus, the head of the column is connected to the body by a frustoconical neck, a cylindrical expansion collar having at least one flow orifice is arranged concentrically against the inner wall of said neck, said pipe for the introduction of hydrolyzate opens into an annular space delimited by said frustoconical neck and said expansion collar, and a distributor for hydrolyzate is arranged below said expansion collar. This embodiment represents an improvement which also assists in resolving said problem of foaming of the hydrolyzate. Thus, not only does the foam have a wider space in which to collapse before ascending too high, the hydrolyzate introduced into the column also has a larger space which promotes a less violent expansion of the gases present therein and, hence, the production of a smaller amount of foam. The expansion collar has at least one flow orifice through which the largely degassed hydrolyzate is able to flow to a distributor intended to distribute it uniformly among the contact elements over the entire cross-section of the cylindrical body.

The gas pumping unit is intended to create and to maintain reduced pressure and is preferably connected to said head in its upper part in order not to aspirate the foam produced by the expansion of the gases present in the hydrolyzate introduced into the column. This pumping unit preferably consists of a mechanical pump, such as a vane pump, for example, for removing the air and a condenser for condensing the steam charged with DCP connected in series. In one preferred embodiment, the apparatus according to the invention comprises an arrangement for regulating said reduced pressure comprising a pressure gauge disposed at the top of said head, a valve for regulating the flow of auxiliary air connected to the gas pumping unit after said condenser and before said mechanical pump and an electronic control circuit electrically connected to said gauge and to said valve. This arrangement has proved to be particularly advantageous because it has a much shorter reaction time than an arrangement based on regulation of the temperature of the condenser, for example. In addition, a device for the removal of DCP from the condensate may be connected to the condenser. A device such as this may consist simply of a buffer vessel placed between the condenser and a wastewater collector intended to collect the condensate flowing from the condenser and to enable it to be overneutralized. This is because it has been found that the 30-50 ppm of DCP which the condensate may contain can be destroyed by overneutralization, particularly by addition of sodium hydroxide.

The sump of the column forms the lower part of the column. It is intended to collect the hydrolyzate which has passed through the cylindrical body filled with contact elements. The steam injection pipe is connected to the column between the sump and the body and may open into a nozzle intended to distribute it uniformly among the contact elements over the entire cross-section of the cylindrical body. The pipe for the removal of hydrolyzate is connected to the sump, preferably at its lowest point. In one preferred embodiment, the apparatus according to the invention also comprises a device for regulating the level of hydrolyzate in the sump connected to the removal pipe. This device may consist, for example, of a level detector arranged in the sump below the steam injection nozzle, a flow regulating valve installed in series in the removal pipe and an electronic control circuit electrically connected to this detector and to this valve.

As mentioned above, the apparatus according to the invention additionally comprises an arrangement for regulating the temperature of the hydrolyzate connected to the pipe for the introduction of hydrolyzate into the column. This arrangement may itself comprise a heat exchanger connected in series on the one hand with said introduction pipe and on the other hand with an auxiliary circuit for the circulation of a heat-carrying liquid, a steam heating circuit for the heat-carrying liquid connected to the closed circuit, a valve for controlling the flow of heating steam, an element for measuring the temperature of the hydrolyzate arranged on the introduction pipe downstream of the heat exchanger and an electronic circuit for regulating the temperatures of the hydrolyzate electrically connected to this element and to this valve. This arrangement for regulating the temperature of the hydrolyzate may be electrically connected by an electronic temperature control circuit to a cell for measuring the density of the hydrolyzate connected to the removal pipe.

In one preferred embodiment, the apparatus according to the invention additionally comprises an arrangement for regulating the flow of hydrolyzate connected to the introduction pipe and electrically connected by an electronic flow control circuit to an arrangement for regulating the flow of steam connected to the injection pipe. These flow regulating arrangements may each comprise a flow measuring cell, a flow regulating valve and an electronic regulating circuit electrically connected to this cell and to this valve. The electronic flow control circuit may impose a preset value for the flow rate of steam according to the flow rate of hydrolyzate. A preset value for a ratio to be maintained between the two flow rates may be manually fed into this control circuit after having been predetermined according to the DCP content of the hydrolyzate before distillation and the acceptable residual content after distillation.

BRIEF DESCRIPTION OF THE DRAWING

The steam distillation apparatus for carrying out the process is described in the following with reference to the accompanying drawing which diagrammatically illustrates a preferred embodiment thereof.

DESCRIPTION OF THE PREFERRED EMBODIMENT OF THE APPARATUS

The apparatus illustrated comprises a distillation column 1 consisting of a cylindrical body 2 filled with contact elements 3, a head 4 and a sump 5. The column 1 is completely surrounded by an insulating jacket 22. The head 4 has a considerably larger diameter than the body 2 to which it is connected by a frustoconical neck 17. A gas pumping unit consisting of a condenser 8 cooled with cold water and a vane pump 9 is connected to the head 4 in its upper part. In the embodiment illustrated, the apparatus comprises an arrangement for regulating the reduced pressure comprising a pressure gauge 23 arranged at the top of the head 4, an electropneumatic valve 24 for regulating the flow of auxiliary air connected to the pumping unit after the condenser 8 and before the pump 9 and an electronic control circuit 25 electrically connected to the gauge 23 and to the valve 24. A certain quantity of auxiliary air is continuously pumped by the pump 9. If the pressure measured by the gauge 23 is below a preset pressure fed manually into the control circuit 25, the control circuit 25 will cause the valve 24 to open to a greater extent to increase the flow of auxiliary air introduced into the pumping unit and vice versa. In addition, the condenser 8 is connected to a wastewater collector 26 by a means for the removal of DCP from the condensate consisting primarily of a buffer vessel 27 equipped with a stirrer 48 in which the condensate may be overneutralized.

A cylindrical expansion collar 18 is arranged concentrically against the frustoconical neck 17 with which it defines an annular space 20. A pipe 7 for the introduction of hydrolyzate connected upstream to at least one hydrolyzate tank or dwell tank by a pump (not shown) opens into the annular space 20. At least one flow orifice 19 is provided at the bottom of the expansion collar 18 to allow the hydrolyzate to flow from the bottom of the annular space 20 to a distributor 21 situated beneath the expansion collar 18 and above contact elements 3 filling the cylindrical body 2.

The sump 5 of the column is intended to collect the hydrolyzate which has passed through the cylindrical body 2. A steam injection pipe 6 connected upstream to a means for generating saturated steam under pressure (not shown) is connected to the column between the sump 5 and the body 2. The pipe 6 opens through a nozzle 28 beneath the contact elements 3. A pipe 10 for the removal of hydrolyzate is connected to the sump 5 at its lowest point. A discharge pump 29 is connected in series with the pipe 10. In the embodiment illustrated, the apparatus comprises an arrangement for regulating the level of hydrolyzate in the sump. This arrangement comprises a level detector 30 arranged in the sump 5 below the nozzle 28, an electropneumatic valve 31 for regulating the flow of hydrolyzate removed connected in series with the pipe 10 and an electronic control circuit 32 electrically connected to the detector 30 to the valve 31.

The apparatus additionally comprises a temperature regulating arrangement 11 which itself comprises a heat exchanger 35 connected in series on the one hand with the pipe 7 for the introduction of hydrolyzate and on the other hand with an auxiliary circuit 33 in which a heat-carrying liquid circulates under the effect of a pump 34; a circuit for heating the heat-carrying liquid comprising a steam feed pipe 36, an electropneumatic valve 37 for regulating the flow of steam, a nozzle 38 for injecting steam into the auxiliary circuit 33 and a pipe 39 for the removal of condensate provided with an excess pressure valve 49; an element 40 for measuring the temperature of the hydrolyzate arranged on the pipe 7 downstream of the exchanger 35; and an electronic control circuit 41 electrically connected to the element 40 and to the valve 37. In the embodiment illustrated, the apparatus also comprises an electronic temperature control circuit 15 electrically connected on the one hand to a cell 16 for measuring the density of the hydrolyzate connected to the removal pipe 10 and on the other hand to the electronic control circuit 41 in which it automatically imposes a preset temperature value according to the density of the hydrolyzate removed.

In the embodiment illustrated, the apparatus also comprises an arrangement 12 for regulating the flow of hydrolyzate introduced into the column and an arrangement 14 for regulating the flow of steam injected into the column. Each of these arrangements comprises a flow measuring cell 42, 43, an electropneumatic flow regulating valve 44, 45 and an electronic control circuit 46,47 electrically connected to the cell 42, 43 and to the valve 44, 45. The electronic circuit 46 is intended to regulate the flow of hydrolyzate around a preset value fed in manually and is electrically connected to the electronic control circuit 47 by an electronic flow control circuit 13. The control circuit 13 is intended automatically to impose a preset value for the flow of steam according to the flow of hydrolyzate in the control circuit 47. A preset value for a ratio to be maintained between the two flows may be fed manually into the control circuit 13.

EXAMPLES

The following Examples are intended to illustrate the process described. In these Examples, the percentages and parts are by weight, unless otherwise indicated. As mentioned above, these Examples are preceded by a description of the method to determine the DCP content of the present hydrolyzates, condensates and seasonings.

Method of determination of the DCP content

Principle

The method comprises adsorption of the product to be analyzed onto a column, elution of the DCP with a mixture of ether and pentane, quantitative analysis by gas-phase chromatography on a capillary column and detection by electron capture.

Reagents

1. Eluent: mixture of 85 parts by volume of pentane and 15 parts by volume of diethylether.
2. 4 μg/ml solution of trichlorobenzene in the eluent.
3. Mixed standard solutions having identical concentrations of 0.1 μg/ml of trichlorobenzene, but graduated concentrations of 0.125; 0.25; 0.5 and 1 μg/ml of DCP in the eluent.
4. 20% solution of NaCl in distilled water.

Apparatus

Gas phase chromatography on a capillary column with a slot injector and a detector operating by electron capture (ionization of a "reactive" gas consisting of 95 parts argon and 5 parts methane using β-rays emitted by $^{63}$Ni).
Integrator and/or recorder

Samples

The samples of which the DCP content is assumed to be above 2 ppm are diluted with the 20% NaCl solution (reagent 4).
Similarly, 20% NaCl are added to the condensates.

Elution 20 g of samples are introduced into the upper part of a small column or vertical cylindrical cartridge containing a granular filling.
The sample is allowed to permeate the filling for a period of 15 minutes.
3×20 ml eluent (reagent 1) are then poured into the column and approximately 40 ml of eluate are collected in approximately 20 minutes at the lower end of the column.
1 ml of trichlorobenzene solution (reagent 2) is added to these 40 ml of eluate.

Chromatography

The column used is a capillary column of fused silica 50 m long and 0.2 mm in diameter coated with a 0.2 μm thick layer of polyethylene glycol having a degree of polymerization of 20,000.
The column is brought to a temperature of 200° C. 24 h beforehand.
The sample is subjected to a heating program comprising keeping it at 115° C. for 10 minutes, then increasing its temperature to 200° C. at a rate of 30° C./min. and then keeping it at 200° C. for 12 minutes.
The injector is brought to a temperature of 250° C. and the opening of its slot is adjusted to 1:10.
The volume of sample injected is adjusted to 1.5 μl (of which only 1/10the permeated the column).
Hydrogen under a pressure of 1.4 bar is used as the carrier gas.
The detector is brought to a temperature of 300° C. 24 h beforehand.
A mixture of argon and of methane in a ratio of 95:5, dried beforehand by passage through a molecular sieve, is used as the reaction gas in a quantity of 30 ml/minute.
The retention times are approximately 5.9 minutes for the trichlorobenzene and approximately 8.5 minutes for the DCP.

Results

The height and/or area of the peaks obtained for the sample and for the standard mixed solutions (reagent 3) are compared.
For the mixed standard solution which comes closest to the sample, a ratio is formed between the heights and/or areas of the peaks corresponding to the DCP and to the trichloroethylene.
The corresponding ratio is formed for the peaks of the sample.
The quotient of the two ratios enables the DCP content of the sample to be established.

Limits of the method

The concentration limit detectable by the present method is situated at around 0.05–0.1 ppm (0.05–0.1 mg of DCP per kg sample).
The percentage removal of DCP achieved by the present method is in excess of 90%.

EXAMPLE 1

Peanut cake is hydrolyzed with 6N hydrochloric acid for 13 hours a 107° C. Humic substances, so-called first insolubles, are then separated therefrom by filtration. A hydrolyzate having a DCP content of 6–7 ppm is obtained.
The hydrolyzate is subjected to steam distillation in an apparatus of the type illustrated in the drawing, completely automated and controlled by a computer, in which the head of the column has a diameter of 2 m and a height of 3 m, the body of the column has a diameter of 1 m and is filled with contact elements over a height of 6 m and the column has a total height of 11.5 m. The contact elements are corrugated metal sheets drilled with holes and applied to one another across the corrugations (contact surface 250 m$^2$/m$^3$).
Over a period of 1 week without interruption, 8000 kg/h of hydrolyzate having a density of 1.260 g/cm$^3$ and a temperature of 62° C. are introduced into the column. A pressure of 200 mbar is maintained in the head of the column. 1440 kg/h of saturated steam, for example under a pressure of 2 bar, is injected in countercurrent into the column. The temperature in the sump is 63° C. 8000 kg/h of hydrolyzate having a density of 1.260 g/cm$^3$ and a DCP content below 0.1 ppm are removed from the column. In addition, the DCP is eliminated from the condensate, coming from the condenser by increasing its pH to at least 11 by addition of NaOH.
The hydrolyzate is left standing for 2 weeks, after which substances which have crystallized slowly and colloidal particles which have agglomerated slowly, so-called second insolubles, are separated therefrom by filtration. A dark-coloured liquid seasoning is obtained of which the DCP content is below 0.1 ppm, although its density, aminoacid composition and organoleptic qualities are no different from those of a seasoning obtained in the same way but without subjecting the hydrolyzate to steam distillation after separation of the first or second insolubles.

EXAMPLE 2

Wheat gluten is hydrolyzed with 6N hydrochloric acid for 12 h at 100° C. Humic substances, so-called first insolubles, are then separated therefrom by filtration. A hydrolyzate having a DCP content of approximately 5 ppm is obtained.

The hydrolyzate is subjected to steam distillation in an apparatus of the type illustrated in the drawing, completely automated and controlled by a computer, in which the head of the column has a diameter of 0.9 m and a height of 2 m, the body of the column has a diameter of 0.4 m and is filled with the same contact elements as in Example 1 over a height of 6 m and the column itself has a total height of 11 m.

Over a period of 1 week without interruption, 2000 kg/h of a hydrolyzate having a density of 1.262 g/cm$^3$ and a temperature of 64° C. are introduced into the column. A pressure of 200 mbar is maintained in the head of the column. 300 kg/h saturated steam, for example under a pressure of 2 bar, are injected in countercurrent into the column. The temperature in the sump is 63° C. 2000 kg/h of hydrolyzate having a density of 1.262 g/cm$^3$ and a DCP content below 0.1 ppm are removed from the column. In addition, the DCP is eliminated from the condensate coming from the condenser by increasing its pH to at least 11 by addition of NaOH The hydrolyzate is left standing for a few days and the second insolubles are separated therefrom by filtration. A dark-coloured liquid seasoning is obtained of which the DCP content is below 0.1 ppm, although its density, aminoacid composition and organoleptic qualities are no different from those of a seasoning obtained in the same way, but without subjecting the hydrolyzate to steam distillation after separation of the first or second insolubles.

We claim:

1. A steam distillation apparatus comprising:
a cylindrical column body;
a head having a diameter larger than a diameter of the column body being connected at a connection to a first end of the column body;
a first arrangement associated with a unit connected to the head for creating, maintaining and regulating a reduced pressure within the column body;
a first pipe connected to the connection between the column body and head for providing material to be steam distilled;
a second arrangement associated with the first pipe for regulating the temperature of the material in the first pipe;
contact elements disposed within the column body positioned and arranged for, in operation, avoiding formation of preferential pathways for steam passing through the column body while allowing material being steam distilled in the column body to flow through the column body and for reducing pressure differences between the ends of the column body;
a sump being connected at a connection to a second end of the column body for collecting material which has been steam distilled;
a second pipe connected to the connection between the column body and sump for providing steam to the column body;
a third pipe connected to the sump for removing steam distilled material from the sump;
a cell connected to the third pipe for measuring density of the steam distilled material; and
an electronic temperature control circuit connecting the cell to the second arrangement for regulating temperature of the material to be steam distilled for enabling regulating the density of the steam distilled material by regulating the temperature of the material to be steam distilled.

2. A steam distillation apparatus comprising:
a cylindrical column body;
a head having a diameter larger than a diameter of the column body and having a connection to a first end of the column body by means of a frustoconical neck which is configured such that its diameter diminishes from a diameter corresponding with that of the head at its connection with the head to a diameter corresponding with that of the column body at its connection with the column body;
a cylindrical collar extending from the connection of the neck and the column body into the head thereby defining an annular space between the collar and the neck and having at least one opening therethrough abutting the annular space for allowing material to be steam distilled to pass from the annular space into the column body;
a first arrangement associated with a unit connected to the head for creating, maintaining and regulating a reduced pressure within the column body;
a first pipe for providing material to be steam distilled being connected to the frustoconical neck at a position such that the material is supplied to the annular space;
a second arrangement associated with the first pipe for regulating temperature of material in the first pipe;
a distributor positioned in the column body beneath the collar for distributing the material to be steam distilled across a cross-section of the column body;
contact elements disposed within the column body positioned and arranged for, in operation, avoiding formation of preferential pathways for steam passing through the column body while allowing material being steam distilled in the column body to flow through the column body and for reducing pressure differences between the ends of the column body;
a sump being connected at a connection to a second end of the column body for collecting material which has been steam distilled;
a second pipe connected to the column body and sump connection for providing steam to the column body; and
a third pipe connected to the sump for removing steam distilled material from the sump.

3. An apparatus according to claim 2 further comprising a cell connected to the third pipe for measuring density of the steam distilled material and an electronic temperature control circuit connecting the cell to the second arrangement for regulating the temperature of the material to be steam distilled for enabling regulating the density of the steam distilled material by regulating the temperature of the material to be steam distilled.

4. An apparatus according to claim 1 or 2 or 3 wherein the contact elements provide a contact surface in the column body per unit volume of up to 250 m$^2$/m$^3$.

5. An apparatus according to claim 1 or 2 or 3 further comprising a third arrangement connected to the first pipe for regulating the flow of material entering the column body to be steam distilled, a fourth arrangement connected to the second pipe for regulating the flow of steam through the second pipe for introduction into the column body and an electronic flow control circuit connecting the third and fourth arrangements for imposing a preset value for the ratio of the flow rate of steam to the flow rate of the material to be steam distilled.

6. An apparatus according to claim 5 further comprising a fifth arrangement connected to the third pipe for regulating a level of the steam distilled material in the sump.

7. An apparatus according to claim 1 or 2 or 3 wherein the column body is surrounded by an insulating jacket for minimizing heat loss from the column body.

* * * * *